United States Patent Office 2,878,288
Patented Mar. 17, 1959

2,878,288

METHOD OF PREPARING SYMMETRICAL DI(2,4,6-TRICHLOROPHENYL) N,N' DICHLOROUREA

Arthur A. Levine, Niagara Falls, N. Y., assignor to E. I. du Pont de Nemours and Company, Wilmington, Del., a corporation of Delaware No Drawing. Application June 9, 1945
Serial No. 598,666

3 Claims. (Cl. 260—553)

This invention relates to a new and improved process for the preparation of symmetrical di(2,4,6-trichlorophenyl) N,N' dichlorourea. More particularly, it relates to controlling the particle size of symmetrical di(2,4,6-trichlorophenyl) N,N' dichlorourea during the process of producing the same.

Symmetrical di(2,4,6-trichlorophenyl) N,N' dichlorourea has been prepared by chlorinating hexachlorodiphenyl urea in a reaction medium consisting of a dilute acetic acid solution. In this reaction, hydrogen chloride is produced and, in order to remove it from the field of reaction, sodium acetate was charged into the reactor prior to the chlorination. The quantity of sodium acetate employed was in excess of the theoretical requirements and was based on the amount of hexachlorodiphenyl urea to be converted. The chlorination was carried out at a pressure of 40 lbs. per square inch and at a temperature of 40° C. The chlorination was continued until no further drop in gauge pressure was indicated, at which time the chlorine feed was stopped. The reaction generally required 3 to 4 hours for completion. At the end of the run, the excess chlorine was vented and the reaction mixture filtered, whereby the symmetrical di(2,4,6-trichlorophenyl) N,N' dichlorourea was filtered off. The product contained sodium chloride, which was removed therefrom by water washing, and the symmetrical di(2,4,6-trichlorophenyl) N,N' dichlorourea was oven-dried at 50° C. to 60° C.

The average particle size of the final product was about 70 microns. For many purposes, a smaller particle size is desirable and advantageous. However, to reduce the particle size from 70 microns to the smaller desired size, requires an additional operation and equipment which increases the cost of the product.

An object of this invention is to provide a new and improved method for the preparation of symmetrical di(2,4,6-trichlorophenyl) N,N' dichlorourea.

Another object of this invention is to provide a method of controlling the particle size of symmetrical di(2,4,6-trichlorophenyl) N,N' dichlorourea during the process of producing the same.

A further object of this invention is to provide a process of directly producing symmetrical di(2,4,6-trichlorophenyl) N,N' dichlorourea of a predetermined average particle size and of high purity.

Other and additional objects will become apparent hereinafter.

The above objects are accomplished, in general, by seeding the reaction medium containing the hexachlorodiphenyl urea with a small amount of micronized symmetrical di(2,4,6-trichlorophenyl) N,N' dichlorourea, and then chlorinating the hexachlorodiphenyl urea. The resulting average particle size of the product depends upon the amount of micronized seed in the reaction medium and varies inversely with the amount of micronized seed present at the beginning of the reaction.

The details and manner of producing the invention will become apparent from the following example:

*Example*

The following charge was introduced in a 2-gallon glass-lined Pflauder reactor:

| | |
|---|---|
| Hexachlorodiphenyl urea | grs__ 419 |
| Sodium acetate | grs__ 450 |
| Reaction medium (composed of 85% glacial acetic acid and 15% water) | cc__ 3100 |
| Sodium chloride | grs__ 36.2 |
| Micronized symmetrical di(2,4,6-trichlorophenyl) N,N' dichlorourea having average size of 3 microns | grs__ 42 |

While the mixture was rapidly agitated, chlorine was fed therein at 40 lbs. pressure and the temperature was maintained between 40° C. and 50° C. The chlorination was continued for 4 hours, at the end of which the excess chlorine was vented and the reaction mixture filtered. The product filtered off was washed with water to remove sodium chloride and other water-soluble materials. The product was then oven-dried at 70° C. The final product contained 14.3% active chlorine, 1.13% unreacted hexachlorodiphenyl urea and 0.02% sodium chloride, and had an average particle size of 3 microns.

As shown by the example, when the reaction mixture prior to chlorination was seeded with micronized symmetrical di(2,4,6-trichlorophenyl) N,N' dichlorourea in an amount constituting 10% by weight of the hexachlorodiphenyl urea to be chlorinated, there was produced a product, the average particle size of which was approximately 3 microns. The invention, however, is not restricted to only such particle size. The process can produce symmetrical di(2,4,6-trichlorophenyl) N,N' dichlorourea having an average particle size less than 70 microns, which is obtained when the reaction mixture is not seeded with the micronized product. The amount of micronized seed based on the quantity of hexachlorodiphenyl urea determines the particle size. However, the ultimate particle size of the product varies inversely with the amount of micronized seed present in the reaction medium at the start of the reaction. In other words, the greater the percentage of the micronized seed based on the hexachlorodiphenyl urea in the reaction medium, the smaller the average particle size obtained. Thus, by the use of an appropriate amount of micronized symmetrical di(2,4,6-trichlorophenyl) N,N' dichlorourea as a seed, a product having a desired average particle size less than 70 microns can be obtained.

The micronized seed can be added to the reaction medium at any time prior to the chlorination. Thus, it can be added, for example, to the reaction medium prior to, subsequent to, or simultaneously with the addition of the hexachlorodiphenyl urea.

The reaction is preferably carried out in a diluted acetic acid solution. In general, the reaction medium should contain from 15% to 25% thereof of water. The invention is not restricted to the use of an acetic acid reaction medium. Other solvents of hexachlorodiphenyl urea can also be used as the reaction medium. As illustrative examples of such other solvents which can be used may be mentioned propionic acid, chloroform, carbon tetrachloride, tetrachloroethane and the like. However, best yields are obtained when acetic acid is used, and for this reason an acetic acid reaction mixture is preferred.

The concentration of hexachlorodiphenyl urea in the reaction medium can be varied within wide limits. It, however, should not be so high as to produce with the other necessary components of the reaction mixture such a mass which cannot be appropriately mixed during the reaction.

As shown by the example, the reaction is preferably carried out at a temperature of from 40° C. to 50° C., but it is to be understood that the invention is not restricted to such specific temperature. In general, a temperature within the range of from 15° C. to 85° C. can be used.

The pressure at which the reaction is carried out is not critical. Though 40 lbs. pressure has given satisfactory results, the pressure at which the reaction can be carried out can be either atmospheric or superatmospheric, depending upon the capacity of the reactor.

The reaction time is also not critical. It, however, should be sufficiently long to permit the reaction to go to completion. The time depends in part on the concentration of the hexachlorodiphenyl urea in the solvent mixture, the pressure under which the reaction is carried out and the temperature, as well as the degree of agitation of the reaction mixture during the reaction. In most cases a period of from 3 to 5 hours is sufficient to permit the reaction to go to completion, though depending on the conditions above mentioned it may be more or less.

The product, as shown by the example, is preferably dried at 70° C. It, however, can be dried at a temperature of from 50° C. to 80° C. Temperatures in excess of 80° C. should not be used since partial decomposition of the product will occur.

Herein the term "particle size" is used synonymously with the term "crystal size."

The instant invention provides a method of controlling the particle size of symmetrical di(2,4,6-trichlorophenyl) N,N' dichlorourea during the production thereof, and thereby makes possible the direct production of the product having a desired average particle size. The method does not require any additional equipment or operations subsequent to the production of the product to obtain the desired particle size. By this invention, products of different batches having substantially the same average particle size can be produced.

Since it is obvious that many changes and modifications can be made in the above-described details without departing from the nature and spirit of the invention, it is to be understood that the invention is not to be limited thereto except as set forth in the appended claims.

I claim:

1. In the process for the preparation of symmetrical di(2,4,6-trichlorophenyl) N,N' dichlorourea by chlorinating hexachlorodiphenyl urea in a reaction medium, the improvement for controlling the particle size of the product which comprises seeding the reaction medium prior to chlorination with a small quantity of micronized symmetrical di(2,4,6-trichlorophenyl) N,N' dichlorourea.

2. In the process for the preparation of symmetrical di(2,4,6-trichlorophenyl) N,N' dichlorourea by chlorinating hexachlorodiphenyl urea in a reaction medium, the improvement for controlling the particle size of the product which comprises seeding the reaction medium prior to chlorination with a small quantity of micronized symmetrical di(2,4,6-trichlorophenyl) N,N' dichlorourea, the amount of the micronized seed being based on the quantity of hexachlorodiphenyl urea initially present in the reaction medium and inversely proportional to the desired particle size of the product.

3. In the process for the preparation of symmetrical di(2,4,6-trichlorophenyl) N,N' dichlorourea by chlorinating hexachlorodiphenyl urea in a reaction medium, the improvement for controlling the particle size of the product which comprises seeding the reaction medium prior to chlorination with an amount of micronized symmetrical di(2,4,6-trichlorophenyl) N,N' dichlorourea constituting 10% by weight of the hexachlorodiphenyl urea initially present in the reaction medium.

No references cited.